M. KENNEDY.
GAGE ATTACHMENT FOR BACKSAWS.
No. 17,432. Patented June 2, 1857.
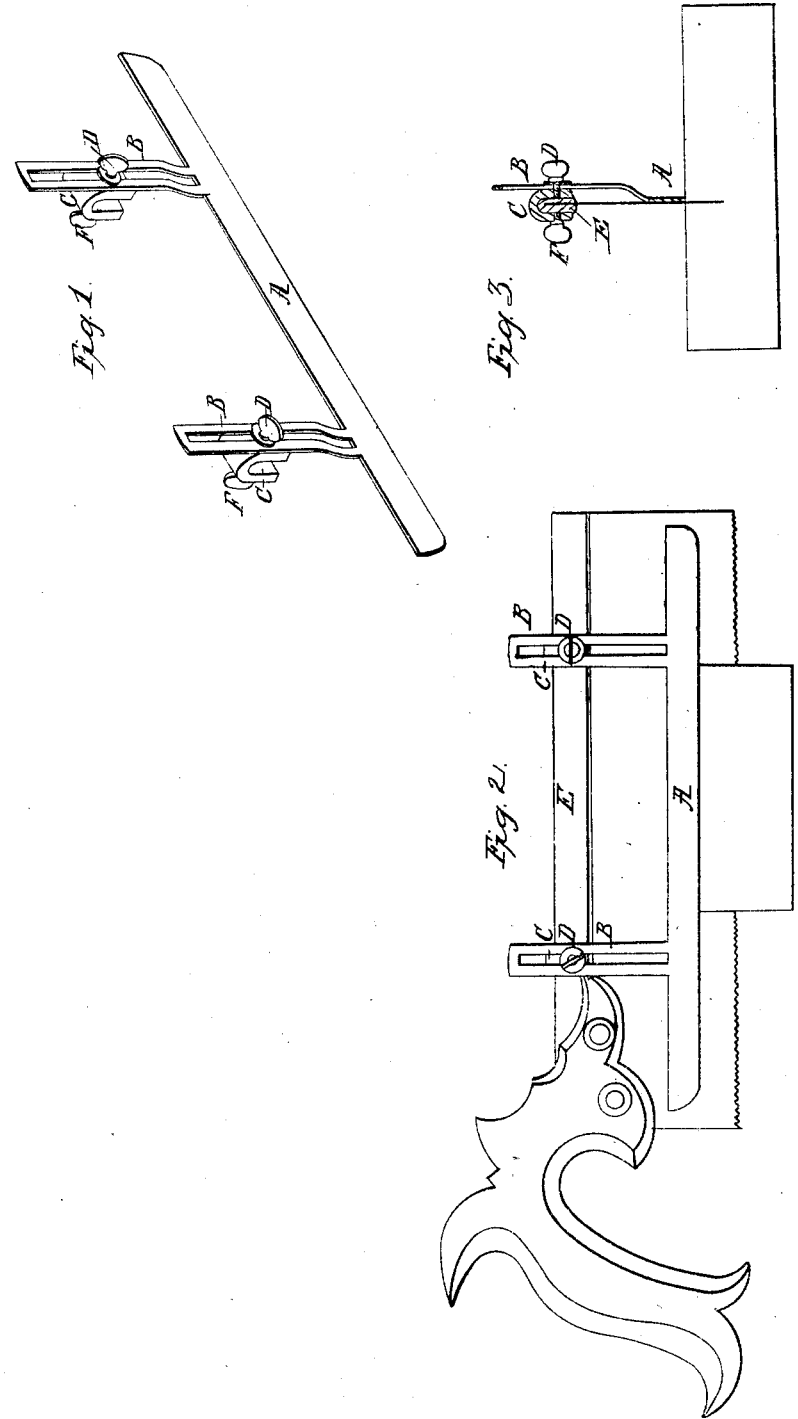

UNITED STATES PATENT OFFICE.

MICHAEL KENNEDY, OF TROY, NEW YORK.

GAGE ATTACHMENT FOR HANDSAWS.

Specification of Letters Patent No. 17,432, dated June 2, 1857.

*To all whom it may concern:*

Be it known that I, MICHAEL KENNEDY, of the city of Troy, in the county of Rensselaer and State of New York, have invented a new and useful Improvement in Gage Attachments for Back-Saws to Regulate the Depth of the Saw-Cut; and I do hereby declare that the following is a full, clear, and exact description of the same, reference being had to the annexed drawings, making a part of this specification, in which—

Figure 1 is an isometrical projection of my improved gage; and, Fig. 2 a longitudinal elevation, and Fig. 3 a transverse section of a back-saw in use with my improved gage attached.

The same letters refer to like parts in all the figures.

Gages to regulate the depth of the cut of hand-saws have been heretofore formed of a straight strip, A, having slotted arms, B, and attached to one side of the saw-blade by set-screws passing through the slotted arms and also through the saw-blade, as described in Messrs. Gray and Fincher's patent of 1855. That mode of fastening the gage to the saw requires that at least two holes should be made through the saw-blade, to the injury of the latter; and, to set the gage at different places longitudinally on the blade, or to apply gages of different sizes to the saw, the saw-blade must be slotted, or, pierced through with as many sets of holes as the gage is to occupy positions, or with as many holes as there are different sizes of gages to be fixed upon the saw. Besides, it often happens that the workman, after setting the gage on his saw with much care to saw work a certain depth, is obliged, before he gets that work finished, to take the gage from his saw entirely, in order to saw other articles; then, on returning to the first job, he is obliged, with that gage, to go through the whole operation of carefully setting the gage, as at the first. Also, carpenters and joiners sometimes temporarily fasten a straight-edge or gage to the saw, without perforating the blade, by means of screw-clamps which embrace both the straight-edge and the saw-blade; but in such cases, since the gage is held to the saw by means of the same clamp by which the set of the gage is altered, the whole gage must be loosened on the saw to readjust the gage; and, removing the gage from the saw, throws the gage out of all adjustment, the same as when the saw-blade is perforated and the gage in such case fastened to the saw by the same screws or other devices which are employed to set or adjust the gage. Now, to avoid the objectionable features of those modes of fastening the gage to the saw, I make the gage with clamps C, C, fastened in an adjustable manner upon the arms of the straight edge, R, by means of the clamp-screws D, D, which reach through the slots in the arms and screw into the outer sides of the clamps, which clamps C, C, are formed so as to be easily slid on, and off, and to fit closely down upon the top of the saw-back E, as shown by Fig. 3, and by means of the set-screws F, F, so as to tightly grip the saw-back at any desired place. When this gage is fixed on the saw, as shown in Figs. 2 and 3, the straight-edge A can be set parallel to, and at any desired distance from, the edge of the saw by means of the clamp-screws D, D, without loosening the clamps C, C, on the saw back; and the gage can, by merely loosening the set-screws F, F, be removed entirely from the saw without altering the set of the gage so that the gage does not require readjusting when it is again attached to the saw.

What I claim as my invention, and desire to secure by Letters Patent, is,

Making the gage for regulating the depth of the saw-cut, with adjustable clamps, C, C, which are formed to fit and grip the saw-back, and are attached to the arms of the gage independently of the set-screws by which the clamps are fastened to the saw-back, as herein described; so that the gage can not only be fastened at any desired place upon the blade without requiring the blade or the saw-back to be perforated, but, so that the gage can also be removed from and replaced upon the saw without altering the set of the gage, and, so that the gage can be adjusted upon the blade without loosening the clamps which hold the gage to the saw.

MICHAEL KENNEDY.

Witnesses:
I. L. BARNEY,
A. F. PARK.